Jan. 5, 1943.　　　E. G. BRIDGES　　　2,307,564
MACHINE FOR MAKING HOLLOW GLASS ARTICLES
Filed Aug. 1, 1940　　　11 Sheets-Sheet 1

Inventor
Edward G. Bridges,

Attorneys

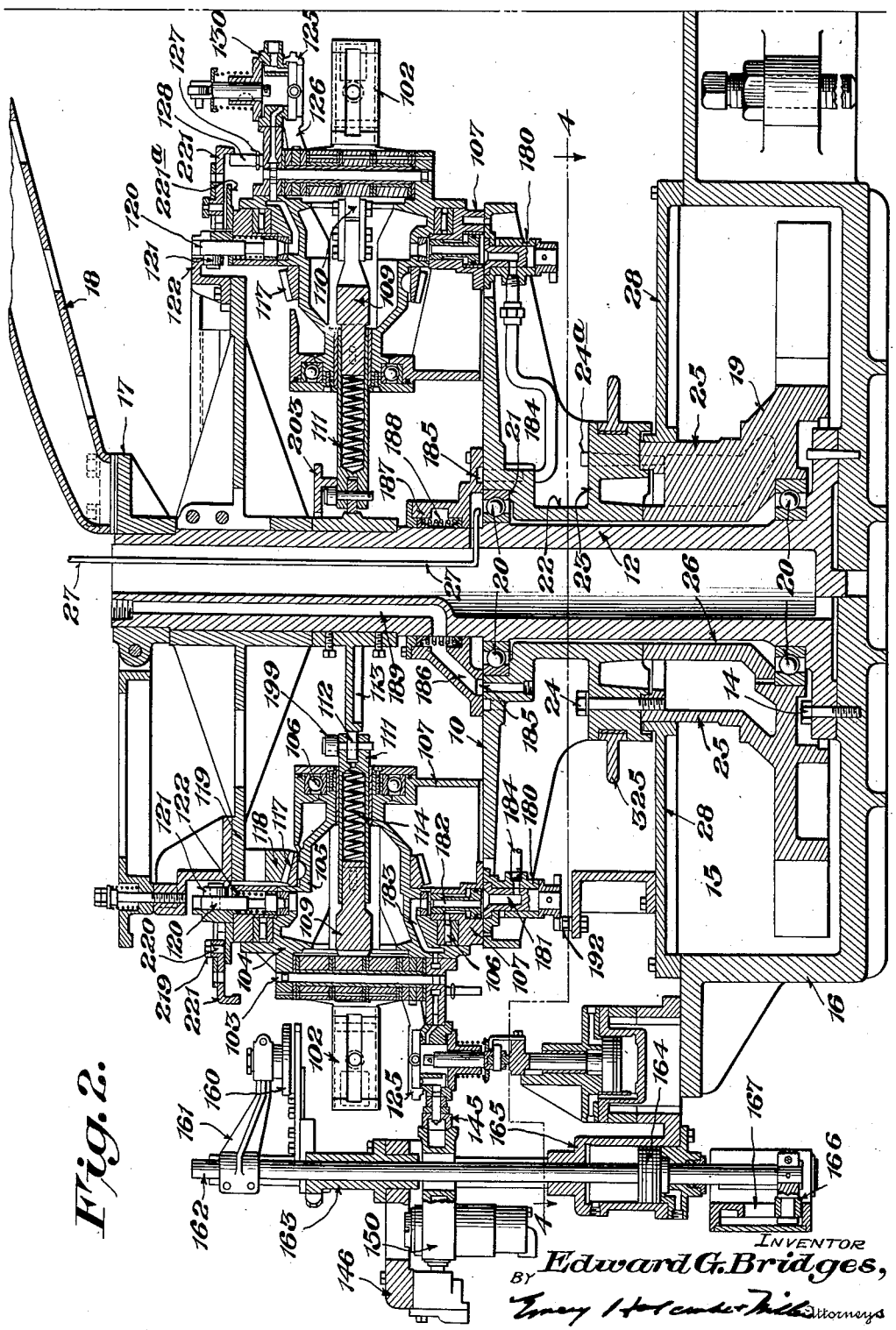

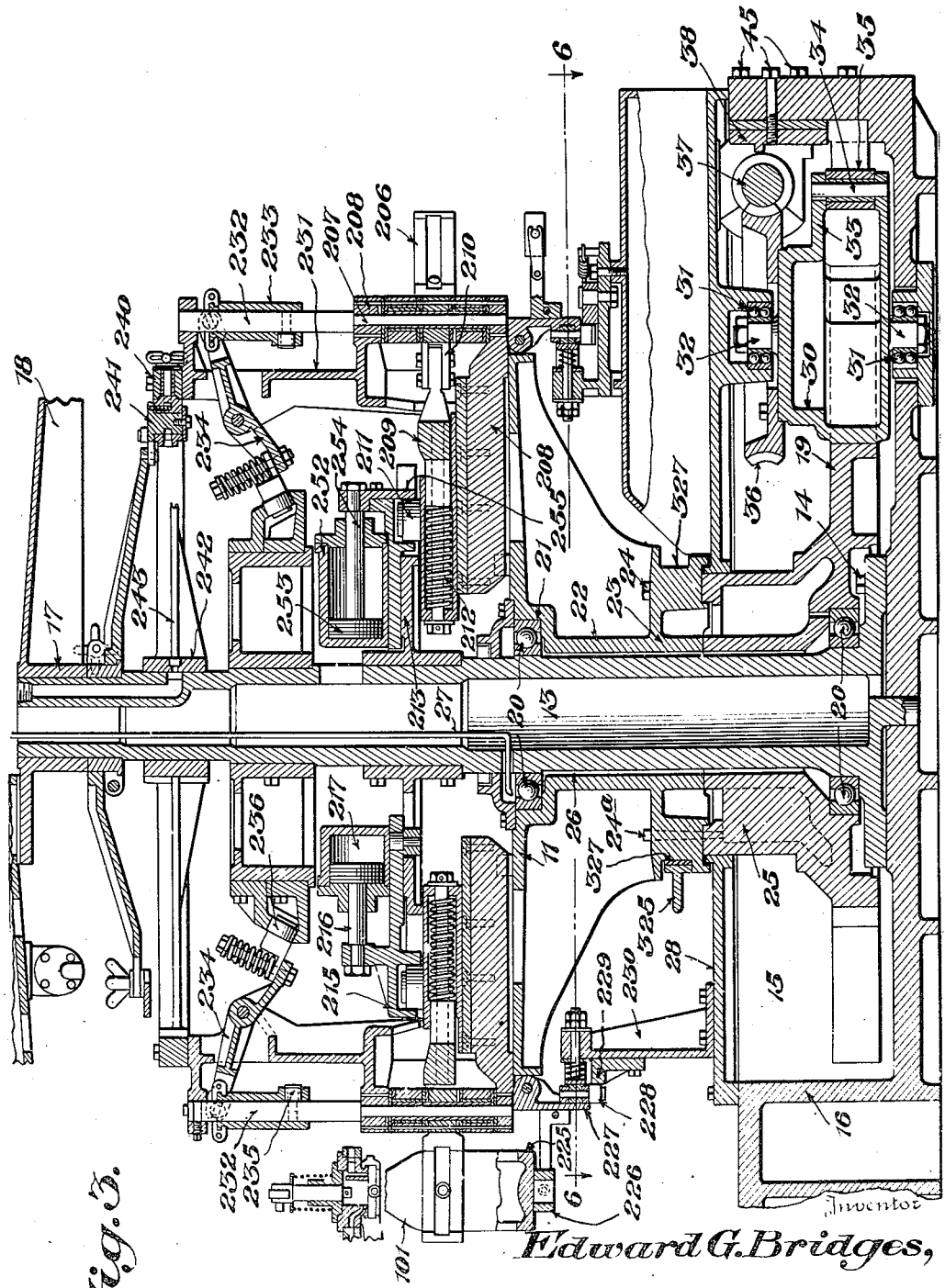

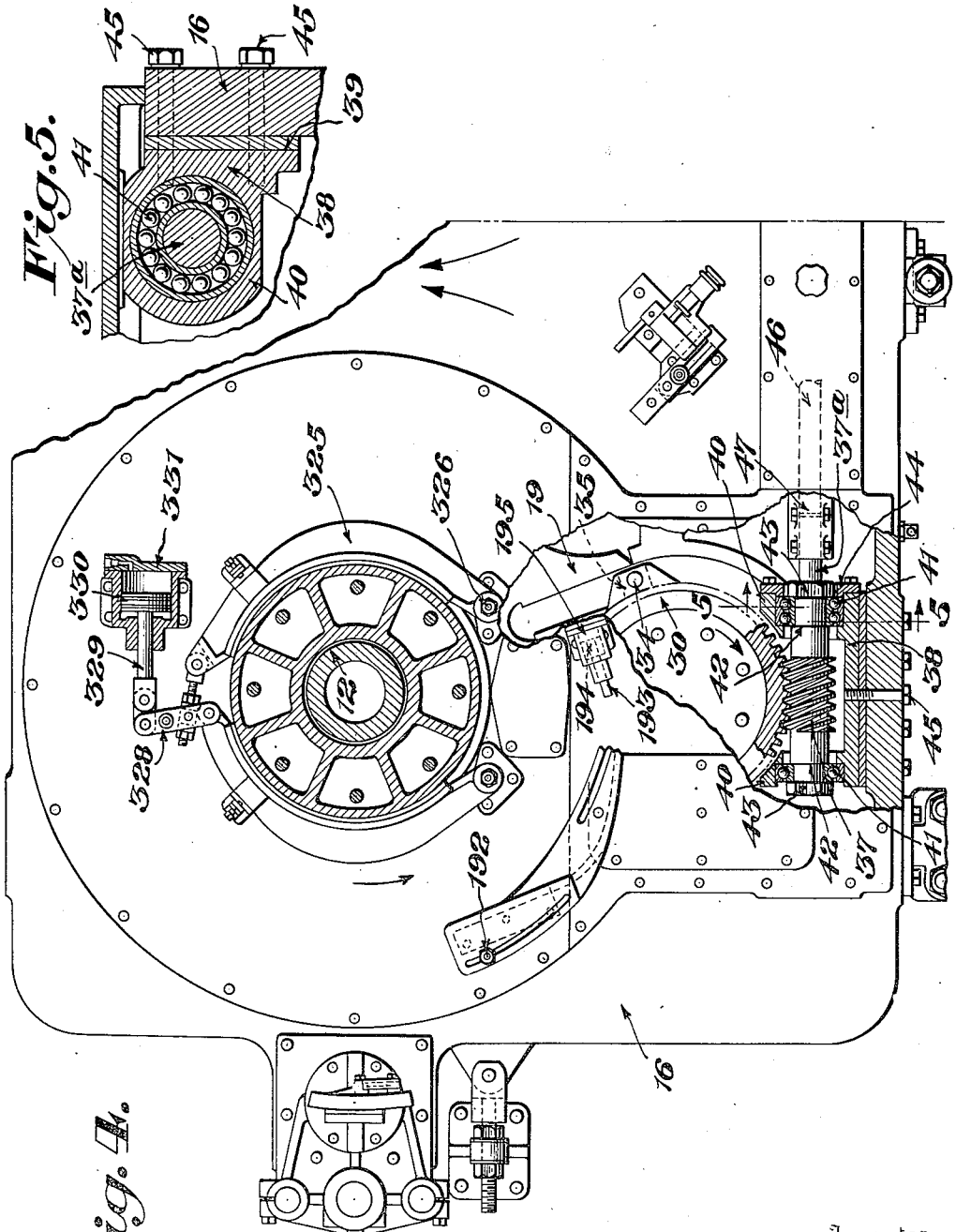

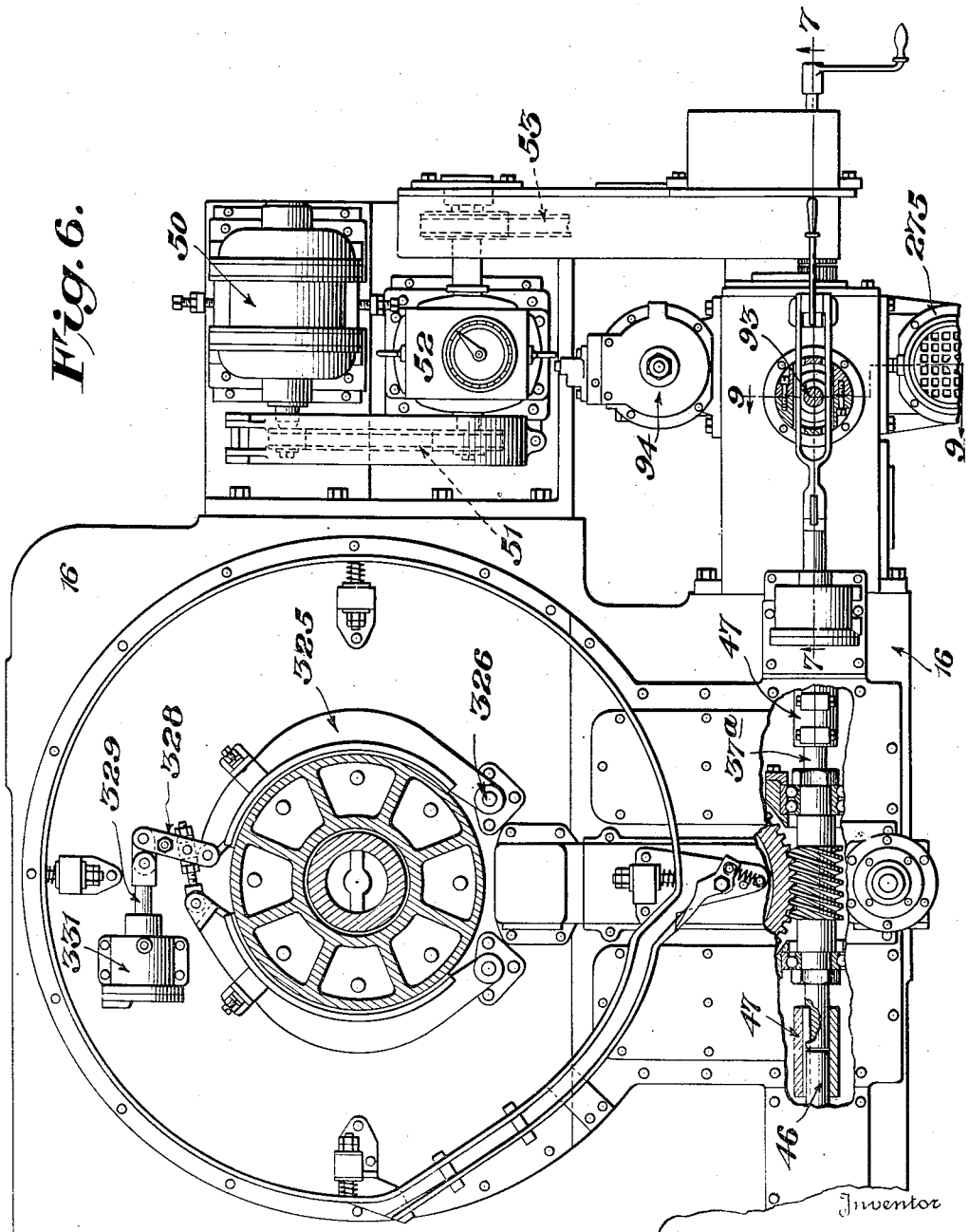

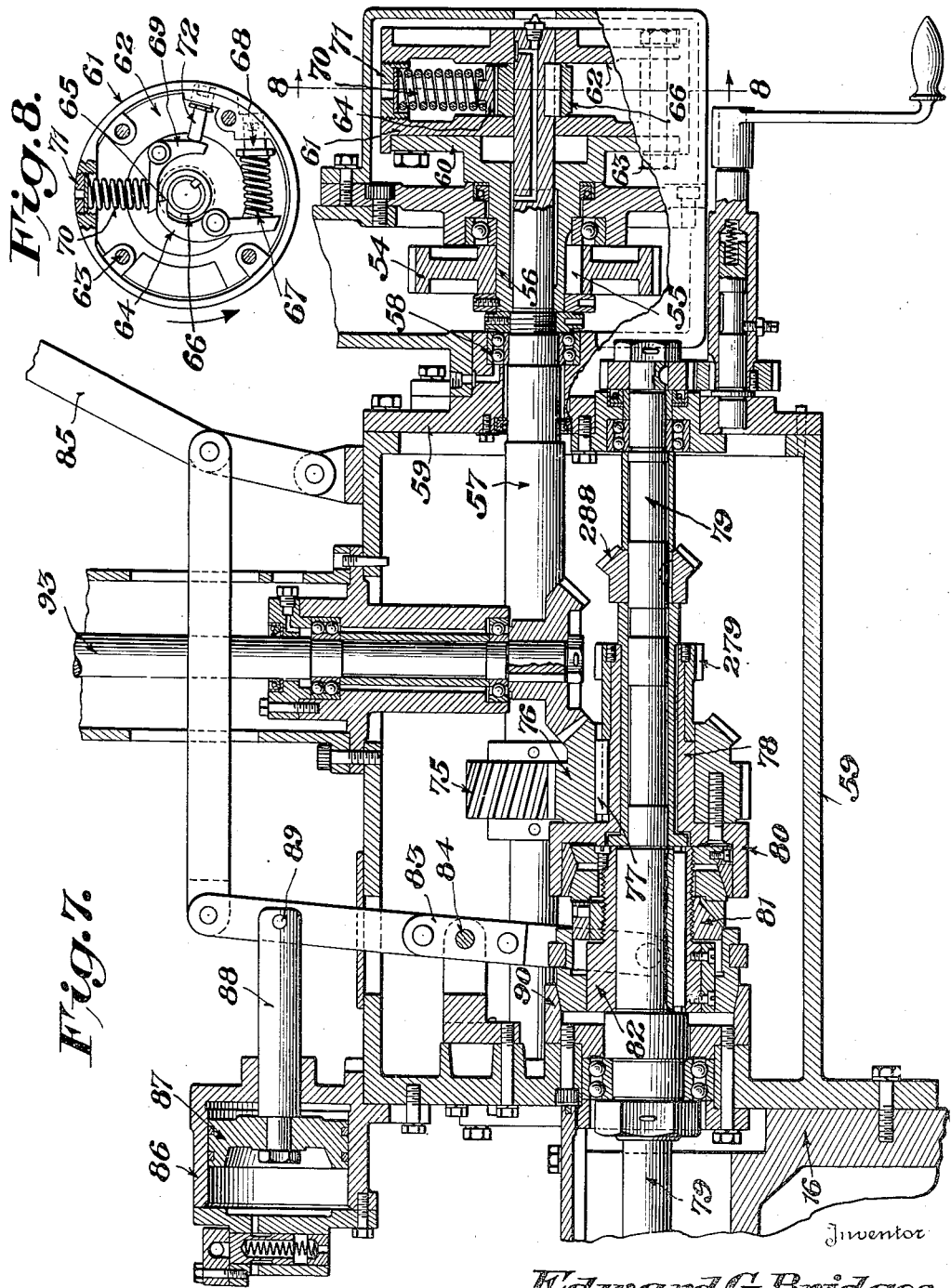

Jan. 5, 1943. E. G. BRIDGES 2,307,564
MACHINE FOR MAKING HOLLOW GLASS ARTICLES
Filed Aug. 1, 1940 11 Sheets-Sheet 7

Inventor
Edward G. Bridges,
Attorneys

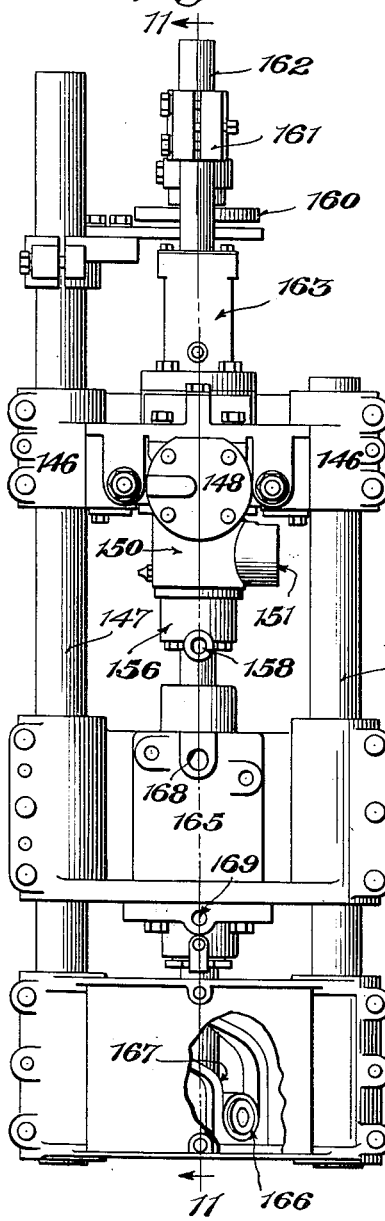
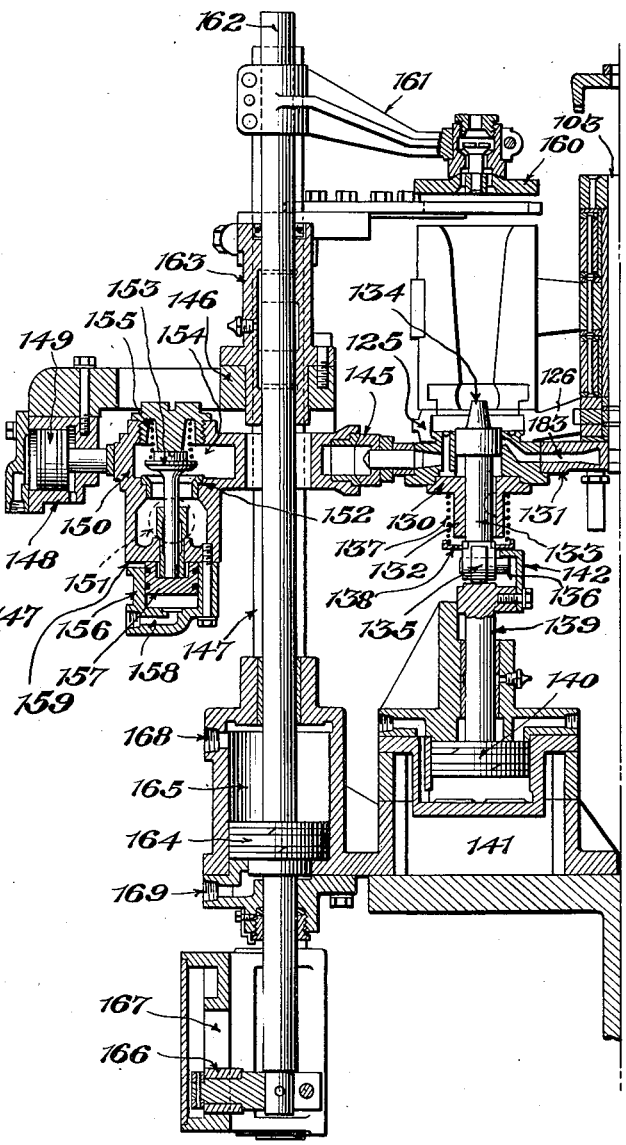
Fig. 10.
Fig. 11.

Jan. 5, 1943.   E. G. BRIDGES   2,307,564
MACHINE FOR MAKING HOLLOW GLASS ARTICLES
Filed Aug. 1, 1940   11 Sheets-Sheet 9
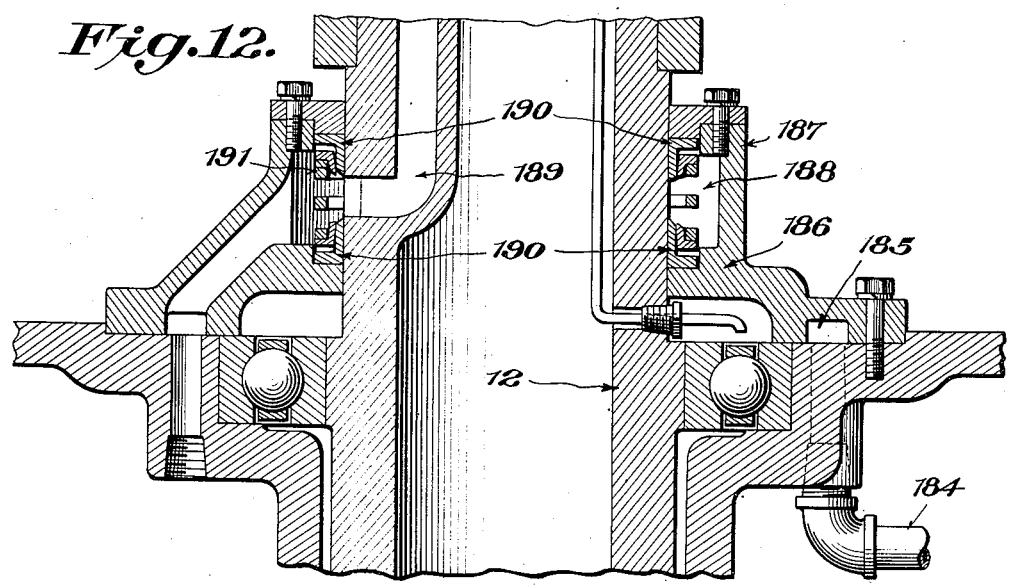
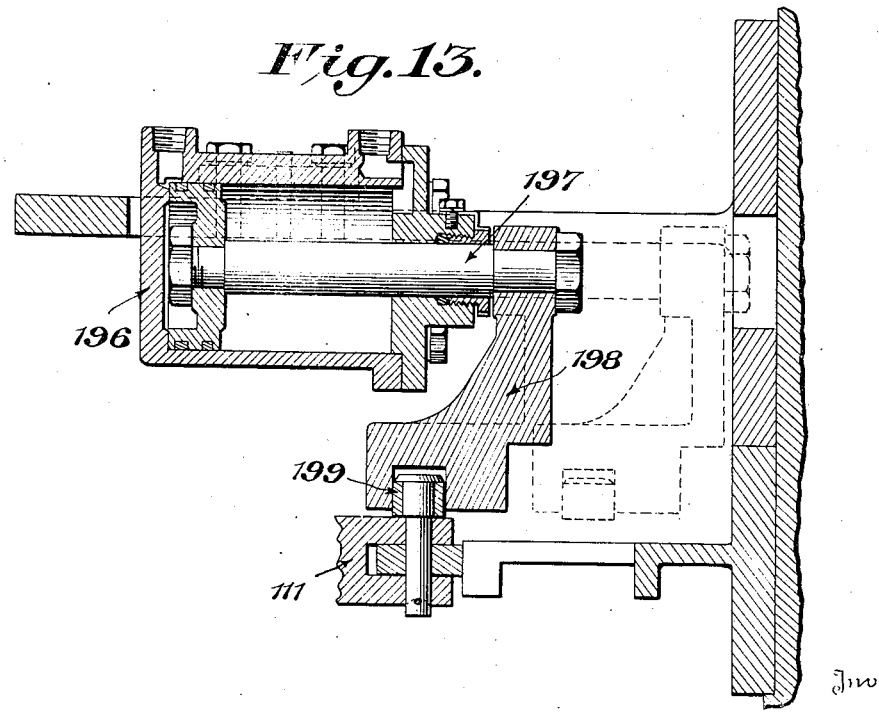
Inventor
Edward G. Bridges,
Attorneys

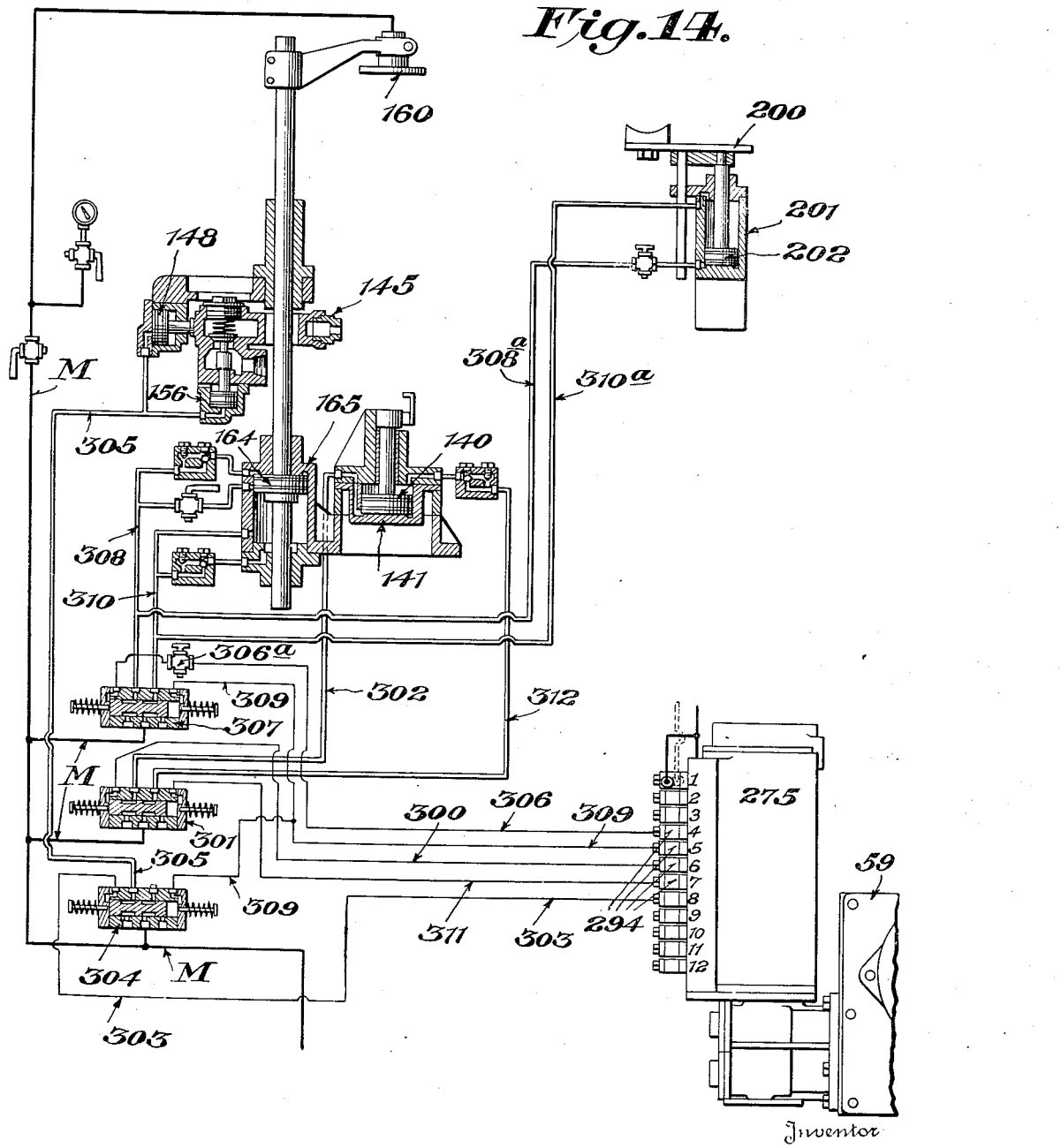

Fig. 15.

Patented Jan. 5, 1943

2,307,564

UNITED STATES PATENT OFFICE 2,307,564

MACHINE FOR MAKING HOLLOW GLASS ARTICLES

Edward G. Bridges, Anderson, Ind., assignor to Lynch Corporation, Anderson, Ind., a corporation of Indiana Application August 1, 1940, Serial No. 349,108

22 Claims. (Cl. 49—9)

The present invention relates to improvements in glass blowing machines, particularly to machines for forming hollow glass containers, and aims generally to improve existing machines for this purpose.

More specifically, the invention aims to improve machines of the general type shown in my prior Patent No. 2,049,422, granted August 4, 1936.

One of the more important objects of the present invention is to improve machines of the type and character of my prior Patent No. 2,049,422 by the provision of an improved motor driven drive mechanism for the mold carriers, and in this respect the present application is a continuation-in-part of my prior copending application Serial No. 177,335, filed November 30, 1937.

Another object of the invention is to improve the construction of means for applying suction to the parison molds for compacting the glass charge in the neck end of the mold around the mouth of the forming pin.

A further object is the improvement of the means and method of forming the parison and blowing the finished article to provide for a better distribution of glass in the finished article to the end that strong usable articles may be made rapidly and economically.

Other objects of the invention will be apparent to those skilled in the art in view of the following more detailed description of the preferred embodiment of the invention which has been selected for illustrative purposes in the accompanying drawings.

In the drawings—

Fig. 2 is a central longitudinal sectional view of the parison mold carrier and its associated mechanism as taken on the line 2—2 of Fig. 1;

Fig. 3 is a similar view of the finishing mold carrier and its associated mechanism as taken on the line 3—3 of Fig. 1;

Fig. 4 is a horizontal sectional view taken on the line 4—4 of Fig. 2, portions of the base being broken away to illustrate the rotating mechanism for the parison mold carrier;

Fig. 5 is a detail sectional view taken on the line 5—5 of Fig. 4;

Fig. 6 is a similar view taken on the line 6—6 of Fig. 3, illustrating the base and rotating mechanism for the blow mold carrier;

Fig. 7 is an enlarged detail sectional view of the transmission taken on the line 7—7 of Fig. 6;

Fig. 8 is a detail sectional view taken on the line 8—8 of Fig. 7;

Fig. 10 is an end elevation of the charge compacting mechanism at station A;

Fig. 11 is a sectional view thereof taken on the line 11—11 of Fig. 10;

Fig. 12 is an enlarged sectional view of the counter-blowing air distributing chamber;

Fig. 13 is an enlarged longitudinal sectional view of the blank mold opening mechanism;

Fig. 14 is a diagrammatic view illustrating the air line connections for operating the charge compacting devices; and Fig. 15 is a diagrammatic view illustrating the air line connections for operating mold opening and closing and braking mechanisms of the machine.

Figure 1:
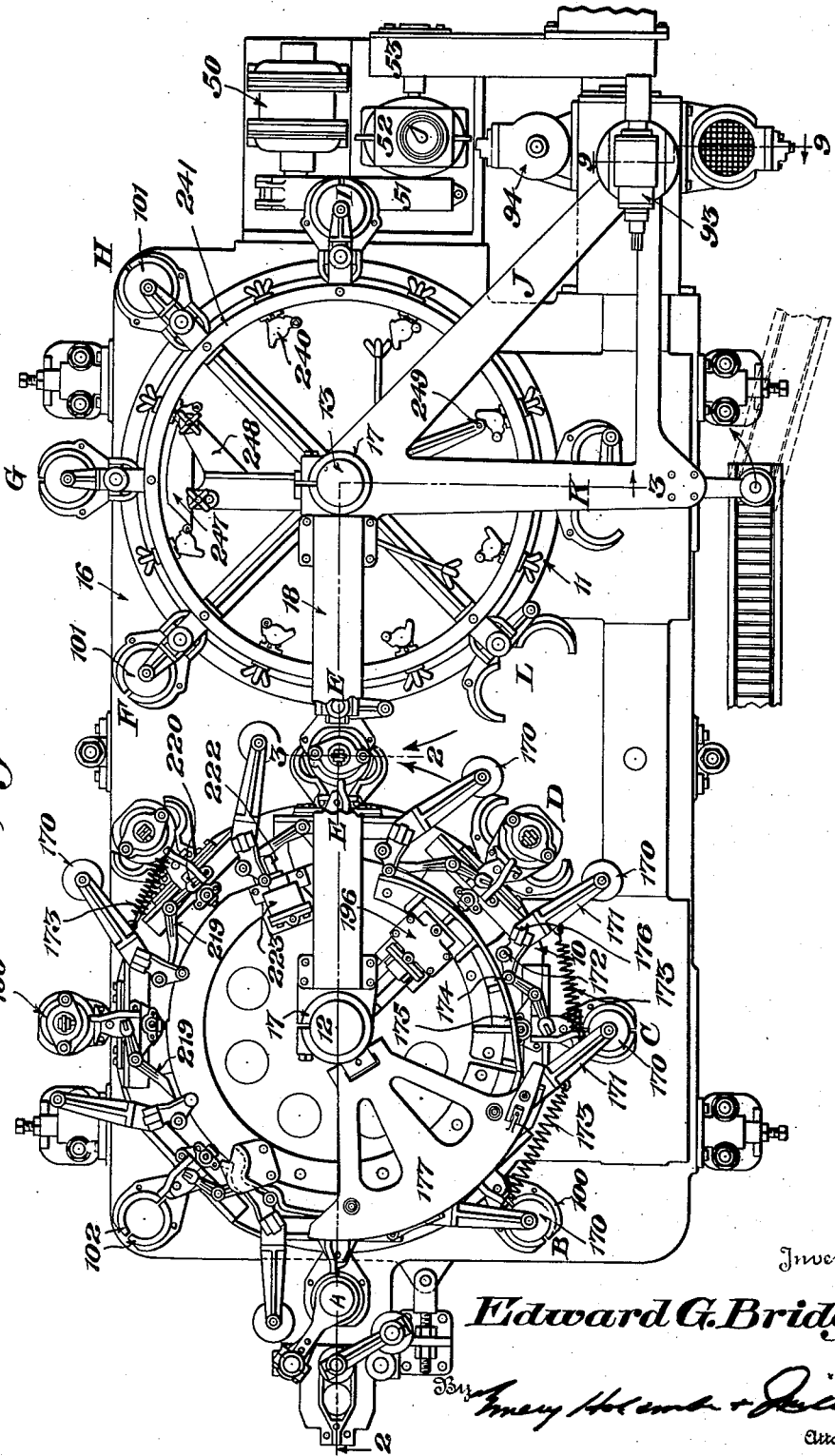
Fig. 1 is a skeleton plan view of the machine.

The machine illustrated in the drawings is preferably of the so-called "two table" type, comprising laterally spaced parison and finishing mold carriers 10—11 rotatably mounted respectively upon central columns 12—13 fastened at their lower ends, as at 14 (Figs. 2 and 3), in a deep well 15 of a suitable base 16. The upper ends of the columns may carry collars 17 bridged by a brace member 18.

Each mold carrier 10—11 is provided with its own driving mechanism, herein illustrated as a Geneva wheel 19, (Figs. 2, 3 and 4) and advantageously each mold carrier and its associated Geneva wheels are formed or connected together to provide a unitary structure surrounding the columns 12 or 13 and rotatably supported thereon, on spaced anti-friction bearings 20.

For example, the mold carriers 10—11 may be formed with an inner recess 21 (Fig. 3) and a central depending hub 22 having a radially extending flange 23 rigidly secured as by bolts 24 and pins 24ª to a central hub 25 of a Geneva wheel 19, formed with a plurality of slotted arms, one for each mold position in the tables 10—11. The assembled Geneva wheel 19 and mold carrier 10 are supported for rotation around the column 13 by means of spaced anti-friction bearings 20, one of the bearings being interposed between the column 13 and the lower hub portion 25 of the Geneva wheel 19, while the other anti-friction bearing is seated in the recess 21 of the mold carrier around the central column. These anti-friction bearings serve to rotatably support the assembled mold carrier 10 and Geneva wheel 19 as well as to maintain them spaced from the column 13, providing an intervening oil space 26. An oil supply 27 may feed oil to the ball ring of the upper bearing 20 which is in communication with the space 26. Cover plates 28 are fastened to the base 16 and have a central opening surrounding the hub portion 25 of the Geneva wheel providing closed lubricant chambers in the base for the Geneva wheels and associated driving mechanism.

A rotator 30 (Figs. 3 and 4) for each Geneva wheel is journalled in anti-friction bearings 31 in the base 16 and cover plates 28. Each rotator 30 is preferably formed of a hollow casting formed with upper and lower trunnions 32, the major portion of the periphery of the casting being concentric with the trunnions 32. The casting includes an eccentric portion 33 carrying a pin 34 on which is rotatably mounted a driving block 35, preferably square in cross section, and adapted for engagement with the slots of the Geneva wheel 19 to impart intermittent rotation to the wheels and mold carriers 10—11.

Secured to the upper surfaces of the rotator casting 30 is a worm wheel gear 36 in mesh with a driving worm 37 adapted to be coupled to a drive shaft. It will be noted, Fig. 3, that the worm gear 36 is cup-shaped and extends above the upper bearing 31, so that the mesh between teeth of the worm 37 and worm gear 36 will be in the plane of the bearing, thus providing an extremely rigid mounting for the rotator, preventing binding between the rotator 30 and abutting concentric faces of the Geneva wheel 19.

Each driving worm 37 is rotatably mounted in its individual mounting 38 (Figs. 4 and 5) secured within the base 16, so that the worm 37 and its mounting are replaceable as a unit. Referring to Figs. 3, 4 and 5, it will be noted that the worm mounting 38 is preferably in the form of a bracket having a machined face 39 and lateral extensions 40 providing shouldered seats for anti-friction bearings 41 at opposite ends of the bracket. The worm 37 and its associated spindle 37ª are shouldered as at 42 with reduced portions extending through the anti-friction bearings 41, the adjacent outer portions of the spindle 37ª being threaded for the reception of jam nuts 43 which may be pinned to the spindle 37ª. Thus the bearings 41 are clamped between shoulders 42 of the spindle 37ª and the adjacent jam nuts 43 and the assembled spindle and bearings are clamped between the shouldered recess of the extension 40 and a clamping ring 44 bolted to one end face of one of the extensions 40. The worm mounting may be secured to the inner machined face of the base by means of a plurality of screws 45 acting to hold the mounting in its proper position.

To replace the worm 37 and its mounting with the rotator 30 and its associated worm gear 36, the cover 28 is first removed from the base. The screws 45 are then removed, permitting removal of the worm and its mounting as a unit, having first uncoupled the worm spindle 37ª from the drive shaft. The entire rotator 30 may then be lifted vertically from the base for repair or replacement. The two worms 37 are connected together for rotation in unison by means of a drive shaft 46 coupled as at 47 to adjacent ends of the worm spindles 37ª (see Figs. 4 and 6).

It will be noticed that the worm 37 for the two mold carriers are oppositely threaded, that is, the worm 37 on the finishing mold carrier is left handed (Fig. 6) for indexing its Geneva rotor in a counter-clockwise direction, while the worm 37 for the parison mold carrier is right handed for indexing its Geneva rotor in a clockwise direction. This results in the parison mold carrier being indexed counter-clockwise and the finishing mold carrier being indexed clockwise, so that an open parison mold with an exposed parison in it, and an open finishing mold, will approach the transfer position from the same side of the machine.

Power driving means is preferably provided for rotating the worms and advantageously comprises an electric motor 50 connected through chain and sprocket drive 51 to a variable speed transmission 52 adjustable to regulate the speed of the machine to a desired number of bottles per minute.

The variable speed transmission 52 is adapted to drive, through chain belt 53, a gear 54 (see Fig. 7) keyed as at 55 to a sleeve 56 loosely rotatable upon a jack shaft 57 rotatably mounted in bearings 58 in a transmission housing 59. The sleeve 56 is formed with an annular flange 60 secured to an overload clutch casing 61 loosely surrounding the shaft 57 so that clutch casing rotates at the same speed as the gear 54.

The overload clutch casing is advantageously formed of two spaced discs 62 secured together by means of a plurality of bolts 63. Pivotally mounted within the housing 61 is a ratchet pawl 64 having an end seated in a ratchet recess 65 in ring 66 keyed to the jack shaft 57. The ratchet pawl 64 is normally held seated in the ratchet recess 65 by means of a spring 67 bearing against the opposite end, the compression of the spring being regulated by a plug 68 threaded into the housing 61.

A second lever 69 preferably, a bell crank lever, is pivoted in the casing 61, one leg of which overlies the pawl 64 and tends to hold the pawl in its ratchet recess. An adjustment spring 70 backed by a plug 71 threaded into the casing 61 exerts a predetermined pressure upon the pawl 64 to hold it in engagement with its recess.

Rotation of the casing 61 is in the direction of the arrow (Fig. 8). If the jack shaft 57 is subjected to an excessive load in excess of the load determined by the springs 67 and 70 the pawl 64 rocks on its pivot and out of engagement with the recess 65. When this happens, the end of the lever 69 is pressed against the ring 66 overlying the ratchet recess 65, permitting the machine to stop without damage. A reset plug 72 is provided for resetting the lever 69 to a released position, permitting pawl 64 to seat in ratchet recess 65.

Mounted on the jack shaft 57, within the transmission housing 59, is a gear 75 (see Fig. 7), in mesh with a gear 76 keyed as at 77 to a sleeve 78 loosely rotatable around the main shaft 79. One end of the sleeve is formed as a cylindrical clutch housing 80 having a clutch face therein. A shiftable clutch member 81 on a sleeve 82, keyed to shaft 79 is movable into and out of engagement with the face of the clutch 80 by means of a clutch lever 83 fulcrumed at 84 and connected with a lever 85 for manually shifting the clutch. Power means in the form of a cylinder 86 having a piston 87 therein, the piston rod 88 of which is connected to the clutch lever at 89 is also provided for operating the clutch as will be more particularly described hereafter. A stationary brake member 90 fastened to the transmission casing is provided for engagement by the shiftable clutch to brake rotary movements of the machine and drive shaft when the clutch is disengaged.

The shaft may be coupled to the adjacent worm spindle 37ª by means of a coupling member 47 (see Fig. 6).

From the above it will be seen that both worms 37 are driven in unison from a common drive source, and because the worms are right and left handed, rotation of the mold carriers will be in the opposite directions.

Figure 9:
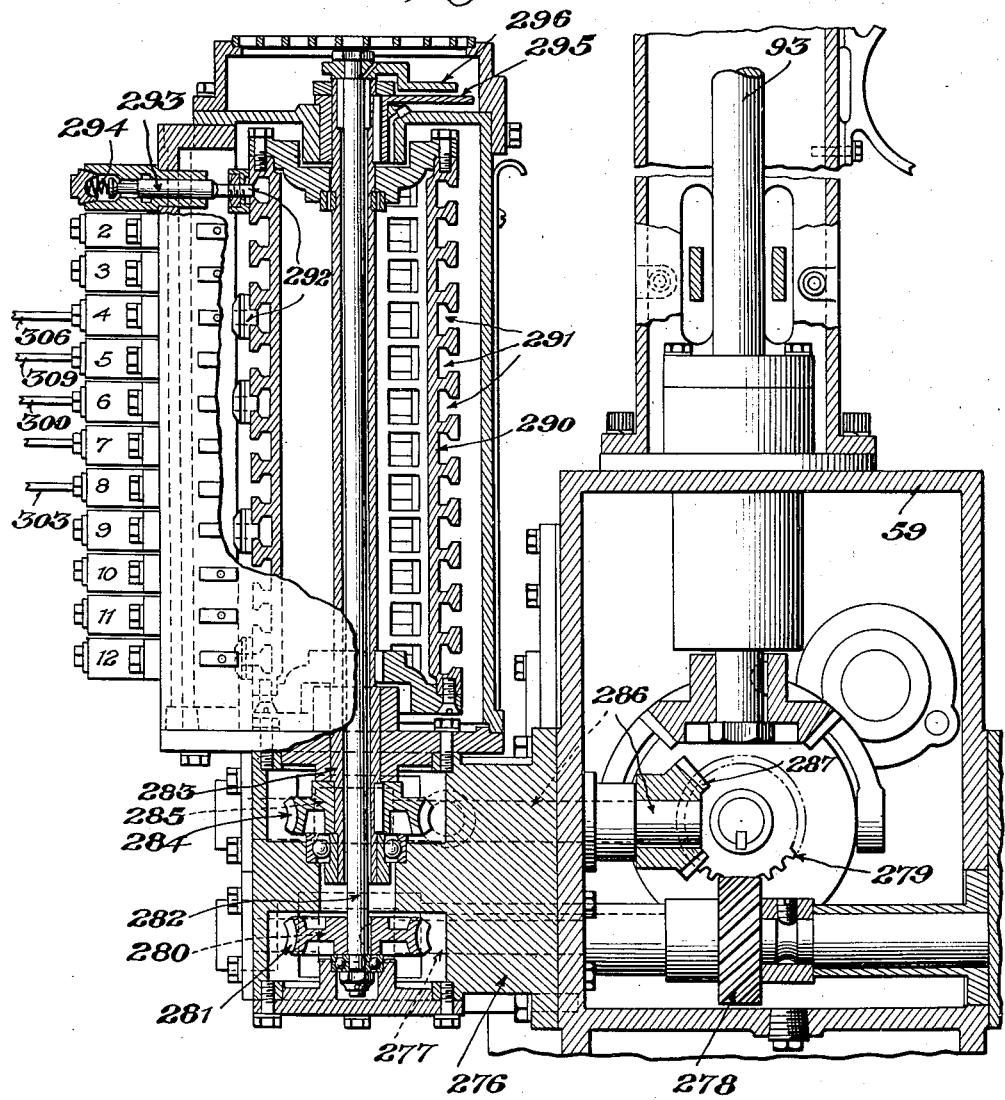
Fig. 9 is a transverse sectional view of the machine timer as taken on the line 9—9 of Figs. 1 and 6.

The illustrated machine may be further provided with feeder timer shaft 93 or 94 (Figs. 6, 7 and 9), either for mechanically operated feeders or air operated feeders, respectively, for synchronizing the operation of a glass feeding device with the forming machine to insure that a charge of glass will be delivered to the forming machine at the charging station at the desired moment a mold is at that station to receive its charge. Advantageously the feeder timer shaft 93 or 94 is driven from a continuously rotating part of the machine transmission, as for example the gear 76 and sleeve 78 (Fig. 7), while the forming machine timer 275 may be driven from the shaft 79 so as to rotate in synchronism with the indexing movements of the forming machine.

The above described features of construction are of advantage in rotary glassware forming machines generally, and particularly those of the two-table or mold carrier type, regardless of the construction of fabricating devices used for the shaping of the articles.

The invention, however, contemplates improvements in the method of and apparatus for manufacturing hollow containers of the narrow-neck type, and in many respects is an improvement upon the method and apparatus shown in my prior Patent No. 2,049,422.

According to the invention there is a series of invertible parison molds 100 on the carrier 10 and a series of finishing or blow molds 101 on the carrier 11 (see Fig. 1).

The parison molds 100 are designed to be presented in inverted or neck end down position at the charging station A, at which position the neck end of the mold is closed by a mouth forming pin mechanism (Fig. 11), so that the mold 100 may receive its charge of glass. At this position suction is applied to the neck mold and parison mold cavities to compact the charge around the mouthforming pin and initially form the neck or mouth end of the finished article. Optionally a compacting blow head may be applied to the upper open end of the mold to admit air under pressure to the top of the glass charge to accelerate the compacting of the charge.

Thereafter the mouthforming pin is withdrawn from the neck end of the parison mold and the machine is indexed to move the mold to the next station or mold position B. During this movement the baffle plate is applied to the upper open end of the mold 100 so that air under pressure may be admitted to the mouth end of the compacted charge to counterblow or expand the charge in the closed parison mold and thus form a hollow preshaped parison of predetermined length. This counterblowing may start before the mold reaches position B and may continue until it reaches or is ready to leave position C. The parison mold is then reverted to upright or neck end up position during movement to position D, at which position the parison body molds are opened exposing the pre-formed parison suspended by the neck rings. The thus suspended parison is then moved to the transfer position E where a blow mold 101 on carrier 11 is closed around it. As the blow molds close around the parisons the neck rings are released therefrom so that the parison is free to move with the blow molds to a reheating position F and final blowing positions G, H, I and J, and thence to the takeout or discharge position K. As the parison molds move from the transfer position E to the charging position A, they are first closed and later inverted to neck end down position.

The parison molds and their mountings may advantageously be of the type and construction shown in my prior Patent No. 2,049,422 and comprise sectional mold halves mounted in holders 102 (see Figs. 2 and 11), pivotally mounted upon a hinge pin 103 in an extension 104 of a mold support 105 rotatable in anti-friction bearings 106 in supports 107 on the mold carrier 10.

The mold supports 105 are each rotatable about a horizontal axis in the bearings 106 and are hollow to lighten the construction and house the connections for opening and closing the molds at the proper time, which preferably include yoke members 109 embracing the hinge pin 103 and the adjacent sides of the molds and connected to the holders 102 at their opposed ends by links 110. The yoke members 109 are each slidable in a sleeve 111 journalled in the mold support 105 (see Fig. 2) carrying at its inner end a roller 112 on a pin and bearing upon the concentric lobe portion of a cam 113 fixedly clamped to the parison mold support column 12. The inward extension of the yoke is slidably connected to the sleeve 111 by a pin working in a slot in the sleeve and a spring 114 may be interposed between the yoke and the sleeve to resiliently urge the yoke into mold closing position.

The parison mold support 105 may be rotated in its bearings 106 by suitable means, as for example, the pinion 117 on the support 105 intermediate the bearings and in mesh with a rack member 118 carried by a fixed support or bracket 119 mounted on the column 12 above the molds. The rack member 118 is preferably placed to engage the pinions 117 of the mold supports during movement of the mold between the third stop position C and the fourth stop position D so as to place the mold in its reverted or upright position preparatory to the opening of the mold. The second rack member 118 on the opposite side of the mold carrier engages the pinion 117 during mold movement toward the charging position to invert the mold prior to its being presented at that position.

Preferably, means for locking the mold in its respective upright positions is provided in the form of a locking pin 120 slidably mounted in an upper portion of the bearing support and normally urged inwardly by means of a spring into locking engagement with one of a pair of oppositely disposed locking pin seats in the rotatable mold support 105. The locking pin 120 is provided at its upper end with a roller 121 adapted when moved with the mold to engage a fixed cam trackway 122 on the support or bracket 119 to lift the locking pin 120 from its locking engagement with the seat in advance of the engagement of the pinion 117 with the rack 118 so as to unlock the rotatable mold support and permit its rotation through 180° by the rack member.

Associated with each parison mold is a neck mold 125 formed in sections and carried in neck ring holders 126 hingedly mounted on the hinge pin 103 so that the neck mold cavity is in axial alignment with the parison mold cavity. The neck mold sections are normally held together by means of a spring 127 (see Fig. 2) connected to pins 128 on each neck mold holder.

Associated with each neck ring holder is a combined suction and blowing unit and a mouthforming pin mechanism which may advantageously include a neck pin housing 130 (Figs. 2 and 11) carried by brackets 131 on the mold supports in alignment with the axis of the neck molds 125. Removably carried by the housing 130 is a guide member 132 on which is slidably mounted a stem 133 carrying a mouthforming pin 134 (Fig. 11) normally extending within the neck mold 125 so as to close the cavity therein. The stem 133 is provided at its opposite end with a roller 135 and an offset pin 136, and a coiled spring 137 surrounding the guide 132 is interposed between the base of the guide and a washer 138 on the stem 133 so as to normally urge the mouthforming pin away from its closed position in the neck mold cavity.

Movement of the stem 133 and its associated mouthforming pin advantageously is controlled by a stem 139 on a piston 140 working in a vertically disposed cylinder 141. As the parison mold is moved into charging position at position A, air, controlled by valve 301 (Fig. 14) later described is admitted to the lower end of cylinder 141 to raise the piston 140 and the mouthforming pin to the cavity of the neck mold 125. Just prior to indexing the mold away from the charging position A, air is reversed in the cylinder to lower the piston so that the yoke 142 overlying the pin 136 will withdraw the mouthforming pin from the neck mold cavity.

As each successive parison mold is moved into charging position, its mouthforming pin is raised to close the mouth end of the neck mold and as the mold is stopped to receive its charge, suction is applied in the parison mold to draw the charge quickly into the neck end thereof and compact it around the mouthforming pin. One object of the invention is to improve the construction of the suction head for use with intermittently rotated machines.

According to the invention, a suction applying mechanism (see Figs. 2, 10 and 11), includes a bracket 146 mounted upon posts or standards 147 projecting vertically from the bed of the machine in position to register successively with the combined suction and blow head housing 130 of the neck molds as they are stopped at the charging station.

The bracket 146 carries a horizontally disposed air cylinder 148 having a piston 149 reciprocable therein, to the stem of which is carried a movable combined suction valve casing 150 and suction head 145. The valve casing 150 preferably is hollow and has a suction inlet 151 communicating with the interior thereof. Above the inlet 151 is a valve seat 152 adapted to be closed by a poppet valve 153, the stem of which extends downwardly through the bottom of the casing 150, being suitably packed against leakage. Above the valve seat is a suction conduit communicating with the suction head 145 so that when the valve 153 is raised above the seat, an unrestricted suction passage 154 is established from the head 145 to the inlet 151. The valve 153 is normally held tightly against its seat 152 by a spring 155.

A valve operating cylinder 156 is removably attached to the lower end of the casing 150 and has a cupped piston 157 reciprocable therein engaging the lower end of the valve stem. When air is admitted to the lower end of the cylinder 156, as for example, through port 158, the piston 157 and valve stem will be raised. Any leakage of air pressure past the piston 157 will escape through leakage port 159 and therefore cannot seep into the interior of casing 150 to destroy the effect of the suction. As will be apparent when air is cut off from port 158, the valve will be instantly closed, due to the action of spring 155.

In the manufacture of certain types of ware it is advisable to additionally compact the glass charge in the parison mold by means of air under pressure applied to the upper end of the charge. This advantageously may be accomplished by means of a blow head 160 mounted on the end of an arm 161 clamped to the upper end of rod 162 reciprocable through a guide 163 carried by the brackets 146, the lower end of the rod being fitted with a piston 164 in an air cylinder 165. The rod 162 extends downwardly beyond the piston 164 and cylinder 165 and is fitted with an offset roller 166 working in a cam slot 167 for the purpose of producing oscillation in the rod during reciprocation and thus swing the blow head 160 from a normal position axially removed from the mold to a closed position thereon. Axial reciprocations of the rod may be effected by alternately admitting air under pressure to opposite ends of the cylinder 165 through ports 168—169, controlled by valve 307 (Fig. 14) later described.

After the glass charge has been compacted in the parison mold, it is advisable to counterblow it to form a hollow parison of predetermined length, and according to the invention, this counterblowing is relatively long and takes place during movement of the mold from position A to position B, and optionally until the mold leaves station C. Accordingly, this counterblow may be for one-half or more of the parison chilling or forming time, i. e. from charging at position A to blank mold opening at position D. The counterblowing of the parison is effected by admitting air under pressure to the mouth end of the parison while closing the upper open end of the mold by a baffle plate.

The baffle plate 170 (see Fig. 1) is mounted upon one end of a bracket 171 pivotally mounted as at 172 upon the support 107 and normally held laterally removed from the axis of the mold by spring means 173 (Fig. 1). The opposite end of the bracket 171 carries a roller 174 adapted to engage a cam track 175 for swinging the baffle plate axially over the mold. As the mold moves away from its charging position at A, the baffle is swung over the mold and a roller 176 on the upper face of the bracket 171 is moved under a cam 177 to lower the closure against the mold. The baffle plate remains on the mold during the stop period at position C and is removed as the mold leaves that position and just prior to reversion (see Fig. 1).

Counterblowing air may be supplied to the mouth end of the parison by means of a rocker valve 180 (Fig. 2) having a passage 181 communicating with a cored passage 182 in the bearing 107 and a passage 183 in the mold support 105 communicating with the combined suction and blowing head 130 surrounding the mouth-forming pin in the manner disclosed in my prior Patent No. 2,049,422.

Air is supplied to the valve 180 by means of a pipe line 184 (Figs. 2 and 12) extending into the mold carrier 10, opening into chamber 185 of the combined air and lubricant cap 186. The cap is formed with a tubular sleeve portion 187 surrounding column 12 and is formed with an annular chamber 188 communicating with an air inlet port 189 in the column 12. An airtight packing is provided between the sleeve 187 and the column 12 above and below the port 189 by means of packing rings 190 expanded against the sleeve 187 and column 12 by a spring 191.

The valve 180 is rocked to supply counterblowing air to the neck end of the parison by means of a pin 192 (see Figs. 2 and 4), adjustably mounted along the path of travel of the valve 180, preferably between stations A and B. Counterblowing preferably continues until the mold reaches station C or optionally as it leaves station C.

The valve 180 is operated to cut off counterblowing air by means of a stem 193 carried by a piston 194 movable in an air cylinder 195 (see Fig. 4) and mounted at station C in the path of the valve 180. Air may be supplied to the cylinder 195 as the parison mold is moved into station C, in which case the stem 193 is moved outwardly to engage and rock the valve 180 to closed position. Optionally air may be cut off from cylinder 195, in which case the stem 193 acts as a stationary stop to rock valve 180 to closed position as the mold leaves station C, insuring a longer counterblow.

As the parison molds leave position C, the baffle plate is first removed from the mold, and then the mold is rotated 180° about a horizontal axis to revert the mold to upright neck end up position. As the mold moves away from position C, the roller 174 on baffle plate bracket 172 is moved from under cam 177 permitting baffle plate 171 to be raised from the mold. The roller 174 then rides on a relieved portion of cam 175, permitting spring 173 to swing bracket 172 and baffle plate axially away from the mold.

As the mold continues to travel toward position D, the pinion 117 on the mold support 105 engages a fixed rack 118 on the bracket 119 and rotates the mold 180 degrees in a manner well known in the art.

At position D the body blank portions of the parison mold are opened away from the preformed parison, leaving the exposed portion supported from the closed neck rings so that reheating of the chilled skin on the parison may start. This is advantageously accomplished by means of an air cylinder 196 (Fig. 13) fixedly mounted on the machine frame at position D and in which is mounted a piston stem 197 carrying a yoke 198 adapted to engage a roller 199 on the sleeve 111. As the mold is moved into position D, the roller 199 moves into the recess in the stem 198. Air is then supplied to the cylinder 196 to retract the stem and open the body blank portion of the mold.

As the body blank portions of the parison mold are removed from the parison, the heat of the glass in the interior of the parison gradually reheats the chilled skin. In intermittently rotated machines, operated by the mechanism disclosed herein the stop or rest period of the molds may equal or exceed the indexing or turning time, and may be of such duration, that the parison approaches a reheated condition while it is halted at position D. When the parison approaches such reheated condition, it has a tendency to stretch, and it must be shortened so that it may be received in the finishing mold. Accordingly, I provide a bottom former 200 (Fig. 14) at station D underlying the suspended parison and adapted to be moved vertically just prior to mold movement from position D to E. The vertical movement advantageously may be accomplished with an air cylinder 201 having a piston 202 thereon, the stem of which carries the former 200.

As the mold moves from station D to E, the roller 199 moves inside a circular holding cam 203 (Fig. 2) which holds the mold sections open.

At position E the position of the parison suspended from the neck mold and the stopped position of the finishing mold are preferably coaxial. As the exposed parison is moved from positions D to E, a cooperating finishing mold on the carrier 11 is being moved toward position E from the same side of the machine, and is partially closed around the parison as both arrive at the transferring position E.

The transfer of the parison to the finishing mold is completed at the transferring position E by final closing of the finishing molds and releasing or opening of the neck rings, so that the parison is wholly supported or confined in the finishing mold.

The construction of the finishing or blow molds 101 their mounting, as well as the final blowing equipment may be of any approved construction and design, that shown being in substance like the corresponding mechanism of my prior Patent No. 2,049,422.

The finishing molds 101 (see Fig. 1), as stated above, are mounted upon the finishing mold carrier 11 and are movable in a closed path intersecting the path of the parison molds at the transfer position E and upon stopping at such position, the molds almost completely embrace the parison supported by the neck molds.

The finishing molds are preferably of the sectional type, similar in construction to the parison molds, being carried in sectional holders 206 (Fig. 3) suitably mounted upon hinge pins 207 in brackets 208 securely mounted upon the finishing mold carrier 11. The molds are adapted to be moved to open and closed position by means of yokes 209 slidably mounted upon brackets 208 and connected at their outer ends with the mold holders by means of links 210. As the mechanism for opening and closing the finishing molds is essentially the same as applied to the opening of the parison molds, it need not be further described other than by general reference to the roller 211 resiliently connected by spring 212 with the yoke 209 and adapted to engage the cam 213 (see Fig. 3), for holding the molds closed as desired. On approaching the transfer position, the molds 101 are gradually slowly closed by suitable mechanism (not shown here) so that the finishing molds close around the moving parisons as they approach the transfer position in unison. When the finishing mold reaches the transfer position, the roller 211 is moved within a fork 215 on a piston rod 216 of a fluid pressure operated motor 217.

As will be explained hereafter, the fluid pressure motor 217 receives air pressure to actuate it in mold closing direction during the time that the mold is standing at the transferring position, and preferably this is timed to occur just following the disengagement of the neck rings from the parison. Radial outward movement of the fork 215 and the roller 211 to close the mold, positions the roller in line with the concentric lobe portion of the cam 213 so that upon the next succeeding movement of the mold away from transferring position, the mold is held tightly closed by reason of the engagement of the roller 211 upon the concentric lobe portion of the cam 213.

The disengagement of the neck mold sections may be accomplished by suitable mechanism, herein illustrated as including a bell crank lever 219 (see Figs. 1 and 2) pivotally mounted on the upper outer end of the bearing and having one of its ends slidably connected with the pin 220 of a yoke 221 slidably mounted upon the bearing 221ª and adapted to engage the pins 128 on the sectional neck ring holders. The opposite end of the lever 219 is positioned in front of a piston rod 222 of a fluid pressure operated motor 223 which is operated to actuate the bell crank lever 219 as the neck mold comes into transfer position, and retract the yoke 221 causing, by reason of its engagement with the neck ring holders, the opening of the neck rings and the release of the parison into the finishing mold.

As is customary in the art, the finishing molds may be open at the bottom end and are adapted to be closed at the time of receiving the parison and during the final blowing of the articles therein by means of bottom plates 225 (see Fig. 3) removably held in bottom plate holders 226, the inner ends of which are vertically adjustable on guides 227 pivoted to the mold support. The lower end of each guide is preferably provided with a roller 228 adapted to roll upon a cam surface 229 carried by arcuate support 230 bolted to the bed frame of the machine and thus providing a cam surface for rocking the guides about their pivotal support and thus moving the bottom plates into and out of position to close the bottoms of the finishing molds at the desired time.

The brackets 208, providing mounting for the hinge pins 207 of the finishing mold holders, are formed each with an upwardly extending standard 231 having a lateral extension at its upper end providing a bearing for the upper end of a post 232, the lower end of which is secured in the upper portion of the bracket 208 preferably axially of the hinge pin 207. Individual blow head carriers 233 for each blow mold are slidably and rockably mounted upon the posts 232, each comprising a sleeve portion embracing the post and formed with a laterally projecting arm terminating in a blow head adjustably mounted thereon, as in my prior Patent No. 2,049,422.

The sleeve portion of the blow head carrier is pivotally connected to a blow head operating lever 234 adapted to be operated to raise and lower the blow head at the proper time. The blow head is normally in its raised position laterally removed from the axis of the finishing mold so that the raising and lowering movement of the blow head must be combined as a laterally swinging movement. To this end a roller 235 on the post 232 is positioned in a cam slot of the sleeve portion so that reciprocating movements of the lever will impart a vertical reciprocating and lateral swinging movement of the blow head.

The blow head operating lever 234 may be formed in two sections resiliently coupled together and actuated by a cam 236 fixed upon the central column 13 of the blow mold carrier so that the pressure exerted upon the blow head in moving it toward the mold will be a resilient one, preventing serious damage and breakage to the exposed necks of the bottles, should the parts not be properly aligned.

Admission of the blowing air to the blow head for blowing the bottle to its finished form may be controlled as to the time of starting, duration, volume and pressure by any suitable means, as for example as shown in by Patent No. 2,049,422, which may comprise suitable distributing valves 240 (see Fig. 3) one for each blowhead, and adjustably mounted upon a suitable support or frame consisting of a rim member 241 mounted at spaced intervals upon the standards 231 by means of suitable fastenings and preferably connected to a collector ring or hub 242 by means of arms fastened to the rim by screws or other suitable means. The valves 240 are preferably of the rocker type and are adapted to control the supply of blowing air from a suitable source, through the collector ring hub 242 and flexible conduits 243 from the collector ring to each of the valves 240. Flexible conduits are provided for connecting each of the valves 240 with its blow head.

Actuation of the valves 240 to admit blowing air to the blow head may be accomplished by means of a cam 247 (see Fig. 1) pivoted to an arm 248 adjustably clamped upon the column 13 by suitable means, as for example a hand clamp.

As is apparent, the commencement of the final blowing may take place during mold movement between positions F and G or G and H as desired. It is desirable to continue the blowing air for as long as possible to facilitate cooling and settling of the article in the finishing mold. In the illustrated embodiment the final blowing operation is terminated by rocking the valve 240 back to its normal closed position, which is advantageously accomplished by means of an arm 249 adjustably clamped to the column 13 by a hand clamp and having an end lying in the path of the arm of the valves 240 to return the latter to normal closed position. Preferably the final blowing continues to station J.

Following the completion of the final blowing, the mold is moved to a takeout position K. Mounted on the cam 213 in radial alignment with position K is a finishing mold opening cylinder 252 (see Fig. 3) having a piston 253 working therein. A piston rod 254 is connected to the piston 253 and has at its outer end a slide 255 movable with the piston rod 254.

As the finishing mold and roller are moved into position K, the roller-receiving fork of the slide 255 should be in its outer or extended position so as to receive roller 211. After the roller 211 has been positioned within the fork, air may be admitted to the outer end of the cylinder 252 to retract the piston 253 therein and fully open the mold ready for the takeout.

The finishing mold leaves position K in a fully opened position, and is moved to position L and then to transfer position, and during this movement the molds are progressively closed around the moving parison, travelling from positions D to E as they jointly approach the transfer position E.

The control of the pneumatically operated devices of the machine, i. e. the fabricating devices, the mold opening and closing devices and the like, are advantageously by means of the machine timer 275 which preferably is of the rotary type driven by the driven shaft of the driving mechanism.

The timing mechanism (see Fig. 9) may advantageously comprise a base 276 adapted to be bolted to the housing 59. A transverse shaft 277 is journalled in the lower portion of the base, one end extending beyond the base and carrying the spiral gear 278 which meshes with the gear 279 on the sleeve 78 (see Figs. 7 and 9), the opposite end of the shaft 277, within the base, being fitted with a worm 280 meshing with a worm wheel 281 on a vertically disposed indicator shaft 282. Thus the indicator shaft rotates in synchronism and at the same speed as the feeder timer shafts as all are driven from the sleeve 78.

Surrounding the shaft 282 is a sleeve 283, to the lower end of which is secured a worm wheel 284 driven by a worm 285 on a shaft 286 journalled in the base 276. One end of the shaft 286 extends beyond the base and into the housing 59 (Fig. 9) and carries a bevel gear 287 adapted to mesh with a bevel gear 288 keyed to the driven shaft 79 (see Fig. 7). Thus the sleeve 283 is geared to and rotates synchronously with the indexing operation of the forming machine, only when the shaft 79 is clutched to the driving sleeve 78 (Fig. 7).

Secured to the sleeve 283 is a timing drum 290 having a plurality of circumferential grooves 291 in which are adjustably mounted cams or buttons 292 adapted selectively to engage at proper times the stem 293 of the poppet valve 294 controlling the supply of air under pressure to various pneumatically operated parts of the forming machine. Adjacent the upper end of the drum, the sleeve carries a gauge plate 295 which rotates therewith and which is surmounted by a pointer 296 fixed to the shaft 282 (see Fig. 9).

The cycle of operations may be best understood by considering the operations as they take place starting with the charging of the parison mold at the charging position A. It will be understood that the halted parison mold receives its charge of glass delivered from a feeding device, either mechanically operated or pneumatically operated and controlled by feeder timers 93 or 94 driven by the machine driving mechanism.

As the parison mold is halted at the charging position, it must be prepared to receive its charge of glass, and before such charge is delivered to the mold, the lower or neck end of the mold must be closed by the mouthforming pin. Accordingly the machine timer delivers a flash of air to line 300 (Fig. 14) leading to one end of plunger cylinder spool valve 301 to shift the valves toward the opposite end and permit the flow of air under pressure from main air line M to line 302 leading to the lower end of cylinder 141, to raise the piston 140 therein as well as the stem 133 and its associated mouthforming pin to close the mouth end of the mold.

Thereafter synchronously with the delivery of the glass charge to the parison mold, the machine timer 275 operates to deliver a flash of air to line 303 leading to one end of spool valve 304 to shift the valve toward the opposite end and thus permit the flow of air under pressure from main air line M to line 305 to supply air to the suction head, shifting cylinder 148 and the suction valve opening cylinder 156 to move the suction head 145 to the mold and open the suction valve 153 to apply suction to the interior of the mold to compact the charge.

A third air line 306 from the machine timer delivers a flash of air to one end of spiral blowdown spool valve 307 to shift the valve toward the opposite end and permit the flow of air under pressure from main air line M to line 308 leading to the upper end of spiral blowdown cylinder 165 to lower the piston 164 and move the blowhead 160 into engagement with the upper end of the mold for the additional compacting pressure. A cutoff cock 306ª is positioned in line 306 and may be closed to prevent operation of the spiral blowdown when this operation is not desired.

The application of the compacting blowing air from the blowhead 160 is terminated by reversing spool valve 307 by means of air supplied to the opposite end of the valve through line 309 controlled by the machine timer 275. Reversal of valve 307 places line 308 on exhaust and admits air from main air line M to line 310, leading to the lower end of cylinder 165 to raise the blowhead. This line 309 also leads to the opposite end of suction head spool valve 304 to shift the valve in the opposite direction, placing line 305 on exhaust and allowing the springs to withdraw the suction head and close the valves 163, thus terminating the compacting of the charge. Similarly, a line 311 from machine timer 275 resets plunger cylinder spool valve 301, placing line 302 on exhaust and establishing the flow of air from main air line M to line 312 leading to the upper end of cylinder 141 to lower the piston therein and withdraw the mouthforming pin from its closed position with respect to the parison mold.

The operation of the bottom former 200 at station D may take place synchronously with the application of the spiral blowdown and hence may be operated by spool valve 307 through lines 308ª and 310ª branching from lines 308 and 310, respectively (see Fig. 14).

Some of the pneumatically operated devices of the machine, such as the parison mold opening cylinder 196 at position D; the neck mold opening cylinder 223 at position E; the finishing mold closing cylinder 217 at position E; and the finishing mold opening cylinder 252 at position K, all are operated in one direction only during the stop or halted periods of the molds and may be reset during succeeding indexing movements. These devices advantageously may be controlled by a main operating valve 315 suitably mounted on the base of the machine which may be of the spool type, the valve being pneumatically controlled by lines 316, 317 controlled by the machine timer 275. Thus, after the molds have been indexed, the machine timer 275 supplies a flash of air to line 316 leading to one end of the main machine valve 315, shifting the valve toward the opposite end and permitting air under pressure from main air line M to line 318 to actuate the parison mold opening cylinder to open the mold at position D; to actuate the finishing mold closing cylinder to finally close the finishing mold around the parison at position E; to actuate the neck mold opening cylinder to open the neck mold at position E and to actuate the finishing mold opening cylinder to open the finishing molds at position K. Later, during indexing, the machine timer admits a flash of air to line 317 to reverse valve 315, placing line 318 on exhaust and establishing the flow of pressure air through line 319 to reverse motors 196, 217, 223 and 252.

Suitable braking mechanism is provided for braking the relative movements of the mold carrier, preferably toward the end of each indexing movement. In the illustrated embodiment of the machine, braking means is provided for each mold carrier, comprising braking shoes 325 pivotally mounted at one end on pins 326 secured to the base cover plate 28 and adapted to move in grooves 327 of the mold carriers. The opposite ends of pairs of shoes 325 are pivotally connected to an actuating linkage 328 (see Figs. 4 and 6) connected in turn to a rod 329 of a piston 330 working in an air cylinder 331.

Figure 15:
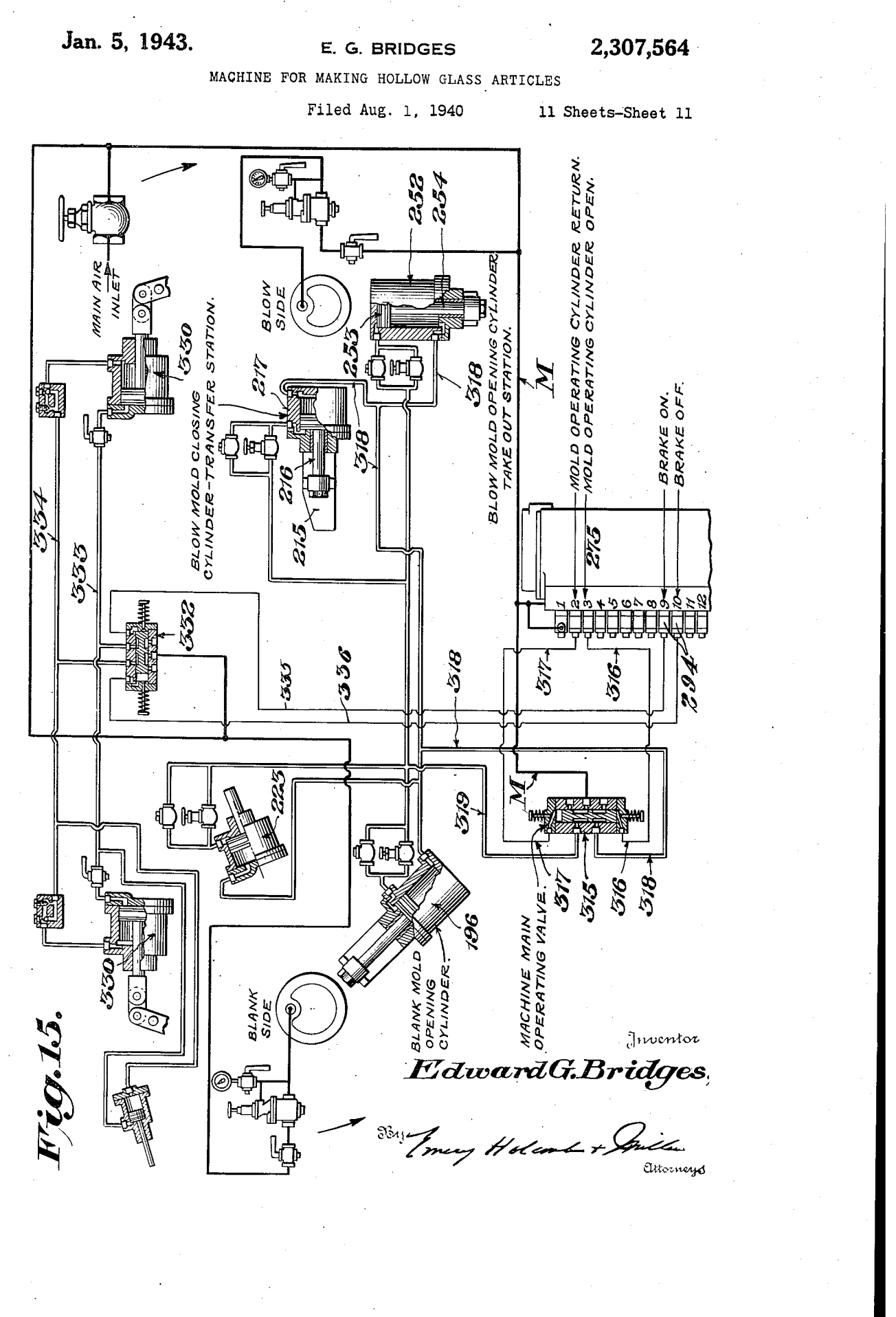

The pair of air cylinders 330 may be operated to apply and release the brakes by means of a brake cylinder valve 332 (Fig. 15) pneumatically connected to the cylinder by air lines 333—334 connected respectively to the rear and forward ends of the cylinders, so that when the valve is shifted in one direction, air may flow from main air line M through line 333 simultaneously to the rear ends of both cylinders 330 to apply the brakes and when the valve is shifted in the opposite direction, air flows from main air line M to line 334 to the forward ends of cylinder 330 to relieve the brakes. The valves 332 may be provided with exhaust ports, as is usual for exhausting air from the lines 333 and 334 which are not under air pressure.

The operation of the valve is automatically controlled to apply the brake during the last half of the indexing movement as the mold carriers approach a stop period and advantageously this is controlled by the machine timer 275 by means of two valves 294 connected to lines 335 and 336 leading to opposite ends of valve casing 332. As the valves 294 are controlled by buttons 292 adjustably mounted on the timer drum 290, the operation of the brake shoes 325 may be variably adjusted to suit desired conditions.

Advantages of my invention reside in the provision of an improved machine for making hollow glass containers, particularly large and heavy ware at a high speed. Many machines are advantageously mechanically driven, and the mechanical drive according to my invention is admirably suited to hard and continuous usage without danger of breakage.

Furthermore, machines of the present invention have been demonstrated as capable of making a larger variety of ware and in certain cases a better grade of ware, than in the machine of my prior Patent No. 2,049,422.

The improvement of the suction applying means renders effective the full effect of the suction or vacuum pump which is not diminished by leakage of atmospheric air or pressure air from pneumatically operated machines.

Obviously the invention is not to be restricted to the details shown and described, but is intended to include equivalents as may fall within the scope of the appended claims.

I claim:

1. A machine for making hollow glass containers and the like comprising a circular series of parison molds and finishing molds, means for intermittently moving said molds in circular paths to a plurality of successive positions, a neck mold for cooperation with each parison mold, a mouth-forming pin mechanism, means presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold while the mold is moving to and is halted at two positions, at least, following the charging position, a reciprocable member mounted adjacent the mold at the second position following charging position and operable for terminating the parison blowing at said station, means for thereafter inverting the parison to neck end up position, means for opening the parison mold away from the parison, means for transferring the parison to the finishing molds, and means for blowing the article to final form in the finishing mold.

2. A machine for making hollow glass containers and the like comprising a circular series of parison molds and finishing molds, means for intermittently moving said molds in circular paths to a plurality of successive positions, a neck mold for cooperation with each parison mold, a mouth-forming pin mechanism, means presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold while the mold is moving to and is halted at two positions, at least, following the charging position, a reciprocable member mounted adjacent the mold at the second position following charging position and operable to terminate the parison blowing as the mold leaves said second position, means for thereafter inverting the parison to neck end up position, means for opening the parison mold away from the parison, means for transferring the parison to the finishing mold, and means for blowing the article to final form in the finishing mold.

3. A machine for making hollow glass containers and the like comprising a circular series of parison molds and finishing molds, means for intermittently moving said molds in circular paths to a plurality of successive positions, a neck mold for cooperation with each parison mold, a mouth-forming pin mechanism, means for presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold while the mold is moving to and is halted at two positions, at least, following the charging position, fluid pressure operated means for terminating the parison blowing, means for thereafter inverting the parison to neck end up position, means for opening the parison mold away from the parison, means for transferring the parison to the finishing molds, and means for blowing the article to final form in the finishing mold.

4. A machine for making hollow glass containers and the like comprising a circular series of parison molds and finishing molds, means for intermittently moving said molds in circular paths to a plurality of successive positions, a neck mold for cooperation with each parison mold, a mouth-forming pin mechanism, means for presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold while the mold is moving to and is halted at two positions, at least, following the charging position, means controlled independently of the movement of said molds for terminating the parison blowing operation, means for thereafter inverting the parison to neck end up position, means for opening the parison mold away from the parison, means for transferring the parison to the finishing molds, and means for blowing the article to final form in the finishing mold.

5. A machine for making hollow glass containers and the like comprising a circular series of parison molds and finishing molds, means for intermittently moving said molds in circular paths to a plurality of successive positions, a neck mold for cooperation with each parison mold, a mouthforming pin mechanism, means for presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold while the mold is moving to and is halted at two positions, at least, following the charging position, means controlled independently of the movement of said molds and operated by the mold moving means for terminating the parison blowing operation, means for thereafter inverting the parison to neck end up position, means for opening the parison mold away from the parison, means for transferring the parison to the finishing molds, and means for blowing the article to final form in the finishing mold.

6. A machine for making hollow glass containers and the like comprising a circular series of parison molds and finishing molds, mechanically driven means for intermittently moving said molds in circular paths to a plurality of successive positions, a neck mold for cooperation with each parison mold, a timer operating in synchronism with said mechanically driven means, a mouthforming pin mechanism associated with said neck molds, means for presenting said parison molds in succession in inverted position at a charging position to receive a charge of glass delivered from above said mold, means for applying fluid pressure differential on opposite ends of the glass charge to compact the charge therein and form a mouth finish on the parison, closure means for the mold for confining the charge therein, means for blowing the parison to hollow form while confined in the parison mold during mold travel and throughout a distance substantially greater than the spacing between the molds, a reciprocable pneumatically operated device positioned at the second position following the charging position and pneumatic connections from said timer to said device, said device in one position being adapted to terminate the parison blowing as said mold is halted at said position and when in another position being operative to terminate said parison blowing as the mold leaves said second position following charging, means for thereafter inverting the parison to neck end up position, means for opening the parison mold away from the parison, means for transferring the parison to the finishing molds, and means for blowing the article to final form in the finishing mold.

7. In a machine for making hollow glass containers and the like, a mold carrier, a plurality of parison molds mounted thereon, cooperating neck molds for each parison mold, means for intermittently rotating said carrier to present said cooperating parison and neck molds successively to a charging position, and including a continuously rotating shaft, a timer geared to and operating in synchronism with said shaft, pneumatically operated fabricating devices mounted adjacent the molds at the charging station and movable relative thereto for initially fabricating the glass charge in the mold while at the charging station, pneumatically operated control valves for controlling the supply of air to said pneumatically operated fabricating devices to move said devices in opposite directions and connections for delivering a flash of air from said timer to said control valves for positively positioning said control valves in operative position permitting the movement of said fabricating device to a selected position for a longer time when determined by the duration of the flash of air from said timer.

8. In a machine for making hollow glass containers and the like, a mold carrier, a plurality of parison molds mounted thereon, cooperating neck molds for each parison mold, means for intermittently rotating said carrier to present said cooperating parison and neck molds successively to a charging position, and including a continuously rotating shaft, a timer geared to and operating in synchronism with said shaft, pneumatically operated fabricating devices including mouth pin mechanism and suction applying mechanism mounted adjacent the molds at the charging station and movable relative thereto for initially fabricating the glass charge in the mold while at the charging station, pneumatically operated control valves for controlling the supply of air to said pneumatically operated fabricating devices to move said devices in opposite directions, and connections for delivering a flash of air from said timer to said control valves for positively positioning said control valves in operative position permitting the movement of said fabricating device to a selected position for a longer time than determined by the duration of the flash of air from said timer.

9. In a machine for making hollow glass containers and the like, a mold carrier, a plurality of parison molds mounted thereon, cooperating neck molds for each parison mold, means for intermittently rotating said carrier to present said cooperating parison and neck molds successively to a charging position, and including a continuously rotating shaft, a timer geared to and operating in synchronism with said shaft, pneumatically operated fabricating devices including mouth pin mechanism and charge compacting mechanism mounted adjacent the molds at the charging station and movable relative thereto for initially fabricating the glass charge in the mold while at the charging station, pneumatically operated control valves for controlling the supply of air to said pneumatically operated fabricating devices to move said devices in opposite directions, and connections for delivering a flash of air from said timer to said control valves for positively positioning said control valves in operative position permitting the movement of said fabricating devices to a selected position for a longer time than determined by the duration of the flash of air from said timer.

10. In a glassware shaping machine, a rotary mold carrier, a plurality of molds thereon, means for intermittently rotating said carrier to present said molds successively to a glass shaping station, means mounted at said station for engaging said molds for applying suction thereto, said last named means comprising a horizontally movable suction-applying head having a passage therein, a suction control valve movable with said head, fluid pressure operated means for actuating said valve, and separate fluid pressure actuated means for moving said head and suction control valve horizontally into engagement with said mold.

11. In a glassware shaping machine, a rotary mold carrier, a plurality of molds thereon, means for intermittently rotating said carrier to present said molds successively to a glass shaping station, means mounted at said station for engaging said molds for applying suction therein, said last named means comprising a horizontally movable suction-applying head having a passage therein, a suction control valve in said passage and movable with said head, a source of suction communicating with said passage rearwardly of said valve, pneumatically operated means for opening said valve, and separate pneumatically operated means for moving said head and valve horizontally into engagement with said mold.

12. In a glassware shaping machine, a rotary mold carrier, a plurality of molds thereon, means for intermittently rotating said carrier to present said molds successively to a glass shaping station, means mounted at said station for engaging said molds for applying suction therein, said last named means comprising a horizontally movable suction-applying head having a passage therein, a suction control valve in said passage and movable with said head, a source of suction communicating with said passage rearwardly of said valve, said valve having a stem extending outside of said passage, a piston fitted on said stem, a separate air cylinder attached to said head around said piston, means for supplying air to the outer of said piston to open said valve, spring means tacting to close said valve, and separate pneumatically actuated means for moving said head.

13. In a glassware shaping machine, a rotary mold carrier, a plurality of molds thereon, means for intermittently rotating said carrier to present said molds successively to a glass shaping station, means mounted at said station for engaging said molds for applying suction therein, said last named means comprising a horizontally movable suction-applying head having a passage therein, a suction control valve in said passage and movable with said head, a source of suction communicating with said passage rearwardly of said valve, said valve having a stem extending outside of said passage, a piston fitted on said stem, a separate air cylinder attached to said head around said piston, means for supplying air to the outer of said piston to open said valve, means for exhausting any leakage of pressure air past said piston, spring means acting to close said valve, and separate pneumatically actuated means for moving said head.

14. In a glassware shaping machine, a rotary mold carrier, a plurality of molds thereon, means for intermittently rotating said carrier to present said molds successively to a glass shaping station, means mounted at said station for engaging said molds for applying suction therein, said last named means comprising a horizontally movable suction-applying member having a passage therein, a source of suction communicating with the rear end of said passage, pneumatically operated means for moving said member horizontally into engagement with said mold, a valve in said passage, pneumatically operated means for opening said valve, and means for excluding from said passage any pressure air leaking past said pneumatically operated means.

15. In a glassware shaping machine, a rotary mold carrier, a plurality of molds thereon, means for intermittently rotating said carrier to present said molds successively to a glass shaping station, means mounted at said station for engaging said molds for applying suction therein, said last named means comprising a horizontally movable suction-applying member having a passage therein, a source of suction communicating with the rear end of said passage, pneumatically operated means spaced from said member for moving said member horizontally into engagement with said mold, a valve in said passage, pneumatically operated means for opening said valve, and means for excluding from said passage any pressure air leaking past said pneumatically operated means.

16. In a machine for making hollow glass containers and the like, a mold carrier, a plurality of parison molds mounted thereon, cooperating neck mold sections for each parison mold, means for intermittently rotating said carrier to present said cooperating parison and neck molds successively to a charging position and including a continuously rotating shaft, a timer geared to and operating in synchronism with said shaft, a suction-applying device mounted at said charging position for engaging said mold and applying suction therein, pneumatically operated means for moving said device horizontally into engagement with said molds, separate pneumatically operated means for controlling the application of suction to said mold, and pneumatic connections between said timer and pneumatically operated means for operating the latter.

17. In a machine for making hollow glass containers and the like, a mold carrier, a plurality of parison molds mounted thereon, cooperating neck mold sections for each parison mold, means for intermittently rotating said carrier to present said cooperating parison and neck molds successively to a charging position and including a continuously rotating shaft, a timer geared to and operating in synchronism with said shaft, a suction-applying device mounted at said charging position for engaging said mold and applying suction therein, pneumatically operated means for moving said device horizontally into engagement with said mold, separate pneumatically operated means for controlling the application of suction to said mold, pneumatically operated control valves for controlling the operation of said pneumatically operated means, and air flow connections for delivering a flash of air from said timer to said control valves.

18. A machine for forming hollow glass articles comprising a rotary mold carrier, a plurality of sectional molds hingedly mounted thereon, means for intermittently rotating said carrier including a continuously rotating shaft, a timer geared to said shaft for synchronous operation with said carrier rotation, a pneumatically operated device fixedly mounted adjacent said mold carrier for engagement with successive molds for moving the sections thereof about their hinged mounting, a valve for pneumatically controlling the application of pressure air to said pneumatically operated device, and air flow connections from said timer to said valve for controlling the operation of said valve and device in proper synchronized timing with relation to the intermittent movements of said carrier.

19. A machine for forming hollow glass articles comprising a rotary mold carrier, a plurality of sectional molds hingedly mounted thereon, means for intermittently rotating said carrier including a continuously rotating shaft, a timer geared to said shaft for synchronous operation with said carrier rotation, a plurality of pneumatically operated devices fixedly mounted adjacent said mold carrier for engagement with successive molds for moving the sections thereof about their hinged mounting, a valve for pneumatically operated devices, and air flow connections from said timer to said valve for controlling the operation of said valve and device in proper synchronized timing with relation to the intermittent movements of said carrier.

20. A machine for forming hollow glass articles comprising a circular series of sectional parison molds, sectional neck molds cooperating therewith, a circular series of sectional finishing molds, means for intermittently moving said molds including a continuously rotating shaft, a timer geared to said shaft for synchronous rotation therewith, separate pneumatically operated devices mounted adjacent said molds for engagement with successive molds for respectively opening the parison molds, opening the neck molds, closing the finishing molds and thereafter opening the finishing molds, a valve for pneumatically controlling the application of pressure air to said pneumatically operated devices, and air flow connections from said timer to said valve for controlling the operation of said valve and devices in proper synchronized timing with relation to the intermittent movements of said carrier.

21. A mechanism for forming hollow glass articles comprising a rotary mold carrier, a plurality of sectional molds hingedly mounted thereon, means for intermittently rotating said carrier, including a continuously rotating shaft, a timer geared to said shaft for synchronous operation with said carrier rotation, braking means, pneumatically operated means for applying said braking means to said carrier to retard the concluding movements of each indexing operation, a valve for controlling application of pressure air to said pneumatically operated means, and air flow connections from said timer to said valve for controlling the application of said braking means in proper timed relation to the intermittent movement of said carrier.

22. A machine for forming hollow glass articles comprising a rotary mold carrier, a plurality of sectional molds hingedly mounted thereon, means for intermittently rotating said carrier including a continuously rotating shaft, a timer geared to said shaft for synchronous operation with said carrier rotation, pneumatically operated braking means for said carrier, a pneumatically operated device fixedly mounted adjacent said mold carrier for engagement with successive molds for moving the sections thereof about their hinged mounting, a valve for pneumatically controlling the application of pressure air to said braking means and pneumatically operated device, and air flow connections from said timer to said valve for controlling the operation of said valve and device in proper synchronized timing with relation to the intermittent movements of said carrier.

EDWARD G. BRIDGES.